April 20, 1965 W. L. LOCKETT 3,179,035
COFFEE BREWER
Filed Aug. 14, 1963
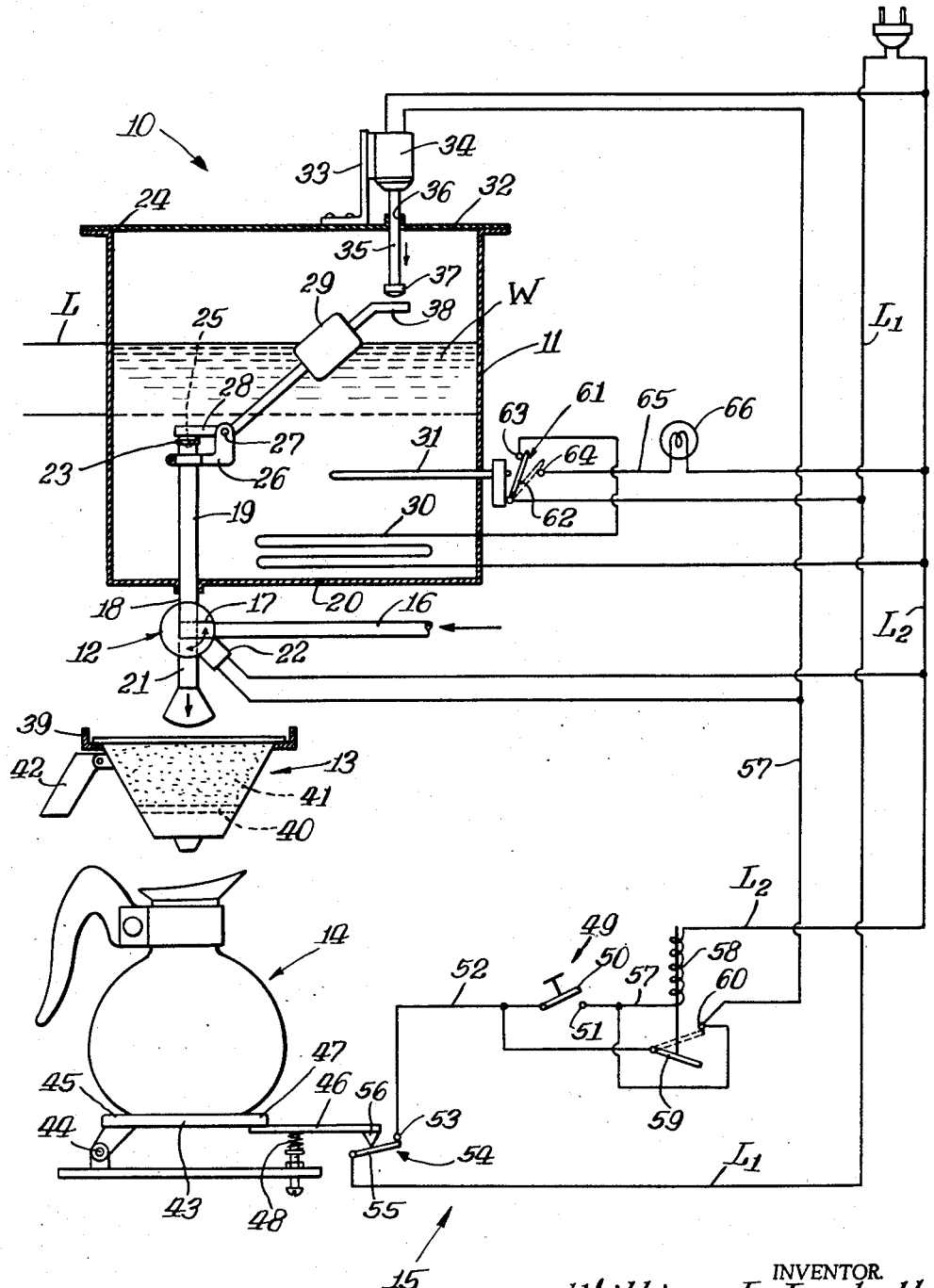
INVENTOR.
William L. Lockett, 3,179,035
COFFEE BREWER
William L. Lockett, Downers Grove, Ill., assignor to Cory Corporation, a corporation of Delaware
Filed Aug. 14, 1963, Ser. No. 302,202
12 Claims. (Cl. 99—282)

This invention relates to brewing apparatus and in particular to apparatus for brewing beverages and the like.

There has been a long-felt need for an economical maintenance-free automatic beverage brewing apparatus for use in brewing beverages such as coffee and the like. The known apparatuses have a number of disadvantages such as complexity of control circuits, complexity of mechanical structure, and relatively high cost. The present invention comprehends an improved simplified beverage brewing apparatus eliminating the above discussed disadvantages of the known brewing apparatuses in a novel and economical manner.

Thus, a principal object of the present invention is the provision of a new and improved brewing apparatus.

Another object of the invention is the provision of such a brewing apparatus having improved simplified means for delivering a preselected quantity of brewing liquid to the brewing cartridge.

A further object of the invention is the provision of such brewing apparatus having new and improved means for controlling the delivery of cold water to and heated water from the hot water supply tank.

Still another object of the invention is the provision of such brewing apparatus having an improved simplified control for providing automatically preselected quantities of beverage such as coffee and the like.

Other objects and advantages of the invention will be apparent from the following description taken in connection with the accompanying drawing wherein the figure is a front elevation of a beverage brewing apparatus embodying the invention partially in vertical section and with the electrical circuitry therein illustrated in schematic form.

In the exemplary embodiment of the invention as disclosed in the drawing, a beverage brewing apparatus generally designated 10 is shown to comprise a hot water supply tank 11, a control valve 12 for selectively controlling the delivery of cold water to the tank 11 and hot water from the tank 11 to a subjacent brewing cartridge 13 wherein the desired beverage is brewed for delivery to a further subjacent decanter 14. The apparatus 10 further includes an improved simplified control circuit generally designated 15 for automatically controlling the operation of the apparatus, as will be discussed in greater detail subsequently.

More specifically, cold water is delivered to within tank 11 from a cold water supply line 16 which may be connected to a suitable source of water under pressure (not shown). The control valve 12 comprises a three-way valve having a movable portion 17 providing communication selectively from cold water supply line 16 to the lower end 18 of a standpipe 19 extending downwardly through the bottom wall 20 of the tank 11, and between the lower end of the standpipe 19 and a discharge outlet 21 directly above the brewing cartridge 13. As shown in the drawing, the valve 12 may be operated by means of a solenoid 22 for automatic selective disposition in the alternative arrangements. The standpipe 19 extends upwardly from the bottom wall to have its upper end 23 disposed at a preselected level below the top 24 of the tank 11. The upper end 23 defines an inlet opening 25 through which cold water passes upwardly into the tank 11 when the valve 12 is arranged as shown in full lines in the drawing to provide communication between the supply 16 and the standpipe 19.

Mounted on the upper end 23 of the standpipe is a bracket 26 carrying a pivot 27. A valve 28 is in turn carried on pivot 27 for selectively closing the opening 25. A float actuator 29 is connected to the valve 28 for swinging the valve on the pivot 27 to the closed position when the water W in the tank 11 reaches an upper preselected maximum level L. The force of the float actuator is sufficient to overcome the pressure of the incoming water from supply 16 and automatically limits the maximum quantity of water in the tank to that shown in the drawing.

The water W in the tank is heated by means of conventional electrical energized heating coil 30 disposed within the lower portion of the tank. Operation of the heating coil 30 is controlled by a thermostatic probe 31 extending through the tank to sense the temperature of the water W therein above the coil 30. A cover 32 may be provided to close the upper end of the tank 11. As shown in the drawing, the cover carries a bracket 33 on which is mounted a solenoid 34 having a plunger 35 extending downwardly through an opening 36 in the cover 32 and provided at its lower end with a button 37 adapted to engage an extension arm 38 on the float actuator 29 to pivot the valve 28 in a clockwise direction as shown in the drawing, and thereby open the inlet opening 25 to the tank.

The brewing cartridge 13 comprises a conventional brewing cartridge which may be carried on a suitable support bracket 39 to dispose the frusto-conical cartridge 13 directly below the discharge element 21 for receiving the hot water from the tank and brewing beverage such as coffee therein. As is conventional in such brewing cartridges, a filter 40 may be disposed across the lower portion of the cartridge whereby the grounds charge 41 is held above the filter for infusion by the delivered hot water and passage through the filter means downwardly into the decanter 14. The cartridge may be provided with a handle 42 for facilitated installation and removal relative to the bracket 39 as for placement of the charge and filter therein and for removal and disposal of the spent charge and filter.

As indicated above, the brewed coffee is delivered to a decanter 14, which may be of conventional construction as shown in the drawing, by passage directly downwardly from the cartridge into the upwardly open decanter. The decanter is carried on a platform 43 having a pivotal mount 44 at one edge portion 45 and provided with an actuating finger 46 at a diametrically opposite edge portion 47. The finger 46 is biased upwardly by a spring 48 against the weight of the decanter and its contents.

The operation of the brewing apparatus 10 may best be understood with reference to the control circuit illustrated in association with the mechanical structure thereof in the drawing. Thus, after the user has installed the cartridge 13 in the bracket 39 with the grounds 41 and filter 40 in place and placed the decanter 14 on the platform 43, he then operates a momentary contact normally open push-button switch 49 having a moving contact 50 and a fixed contact 51. The moving contact 50 is connected by a conductor 52 to a fixed contact 53 of a weight switch 54 having a moving contact 55 normally closed with fixed contact 53, as shown in the drawing. The finger 46 includes a distal portion 56 which bears against the moving contact 55 to open the switch 54 when the weight of the decanter and the contents therein reaches a preselected weight corresponding to a full condition of the decanter. When the decanter is empty, as at the initiation of a brewing cycle, the weight is insufficient to open the switch 54 and a circuit is completed through the switch 54 to one power supply lead $L_1$. The closing of push-button switch 49 by the user completes a circuit from power supply lead $L_1$ to a conductor 57 and through a relay coil 58 to the other power supply lead $L_2$. The resultant energization of the coil 58 closes a moving contact 59 with a fixed contact 60, moving contact 59 being connected to conductor 52 and fixed contact 60 being connected to conductor 57. Thus, a holding circuit around push-button switch 49 is established to maintain the circuit from conductor 52 to conductor 57 for maintaining energization of the relay coil 58 upon release by the user of the push-button switch 49.

Conductor 57 is further connected to the solenoid 22 of the three-way valve 12 which in turn is connected to the power supply lead $L_2$, thereby causing the solenoid 22 to be energized at this time and move to the dotted line position shown in the drawing, wherein communication is provided between the standpipe 19 and the discharge outlet 21. This arrangement of the valve 12 precludes further delivery of cold water from supply conduit 16 to the standpipe at this time. Still further, conductor 57 is connected to the solenoid 34 which in turn is connected to the power supply lead $L_2$ whereby the solenoid is energized at the time and forces the plunger 35 downwardly against the float arm 38 to pivot the valve 28 away from the standpipe opening 25 and thereby permit the hot water in tank 11 to flow downwardly through the standpipe from the upper level L. The hot water passes through the standpipe 19 and downwardly therefrom through the discharge outlet 21 into the cartridge 13 where the coffee is brewed. The brewed coffee then passes downwardly through the filter 40 to the decanter 14.

When sufficient coffee is delivered into the decanter 14 to depress the platform 43 against the action of spring 48 and cause finger portion 56 to open switch 54, the circuit to the solenoid 22 of valve 12 and solenoid 34 is broken. Deenergization of solenoid 22 causes the valve 12 to move to the full line position of the drawing whereupon the outlet 21 is closed and cold water is delivered from conduit 16 upwardly through standpipe 19 and into the tank 11. As solenoid 34 is de-energized at this time, the plunger 35 is retracted upwardly, allowing the float 29 to move upwardly with the level of the water in the tank until it reaches the level L shown in the drawing whereupon the valve 28 is closed across the opening 25 thereby preventing further delivery of cold water into the tank.

The thermostat sensing element 31, as shown in the drawing, controls a switch 61 having a moving contact 62, a first fixed contact 63, and a second fixed contact 64. As shown in the drawing, the movable contact 62 of switch 61 is connected to power supply lead $L_1$ and fixed contact 63 is connected to the heating coil 30, the other side of the heating coil being connected to power supply lead $L_2$. Thus, when the temperature of the water W in the tank is relatively low as directly subsequent to a refilling thereof as discussed above, the movable contact 62 of switch 61 is closed with fixed contact 63 thereby completing the circuit to the heating coil 30 whereby the water in the tank is heated. When the temperature sensed by the element 31 reaches a preselected high temperature suitable for brewing the coffee in cartridge 13, the sensing element 31 causes moving contact 62 to move from fixed contact 63 to fixed contact 64, thereby de-energizing the heating coil 30 and providing a circuit from power supply lead $L_1$ through a conductor 65 to a "Water Ready" indicator lamp 66 which in turn is connected to power supply lead $L_2$. Thus, when the lamp 66 is illuminated, the user is apprised of the fact that the water within the tank is suitably hot for brewing a subsequent quantity of coffee.

The improved apparatus 10 provides a positive interlocking between the delivery of the cold water into the tank 11 and the delivery of the hot water therefrom to the cartridge 13 by means of the three-way valve 12. Thus, the control of the delivery of hot water through the cartridge 13 for brewing of the desired quantity of beverage is effected in apparatus 10 in a simple manner with simple and economical structure which may be readily maintained and which provides long trouble-free life. The apparatus 10 is extremely simple to use in brewing coffee or similar beverage wherein a preselected quantity of hot water is passed through a suitable charge carried in the cartridge. The cartridge itself is readily maintained by simply discarding the spent charge and filter, rinsing the cartridge and replacing a filter and charge as desired.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Brewing apparatus comprising: a tank having a bottom and a top; a conduit extending through the bottom of the tank and having a discharge opening below the tank and a portion within the tank provided with an inlet opening spaced below said tank top; means for delivering cold water to said conduit; means for heating water in said tank; means for closing said discharge opening; means for closing said inlet opening; brewing means disposed to receive hot water from said conduit discharge opening for brewing a beverage therein and delivering the brewed beverage therefrom; and control means for selectively operating said cold water delivering means, discharge opening-closing means, inlet opening-closing means, and water heating means, whereby (a) cold water is delivered through the conduit with the discharge opening closed and with the inlet opening open for delivery into the tank to raise the level of water therein to a preselected upper level above the level of said inlet opening, then (b) concurrently the inlet opening is closed, delivery of cold water from said delivering means is discontinued, and said water heating means is energized to heat the water in the tank to a preselected high temperature, and (c) subsequent brewing of beverage in said brewing means is permitted when desired subsequent to the reaching of the preselected high temperature of the water in the tank upon actuation of said control means to concurrently open said inlet and outlet openings to permit passage of hot water downwardly through the conduit to the brewing means for brewing a preselected quantity of beverage therein.

2. The brewing apparatus of claim 1 wherein said control means includes means responsive to the weight of brewed beverage delivered from said brewing means.

3. The brewing apparatus of claim 1 wherein said control means includes float means responsive to the water level in said tank reaching said preselected level to close said inlet opening.

4. Brewing apparatus comprising: a tank having a bottom and a top; a conduit extending through the bottom of the tank and having a discharge opening below the tank and a portion within the tank provided with an inlet opening spaced below said tank top; means for delivering cold water to within said conduit; means for heating water in said tank; means for closing said discharge opening; means for closing said inlet opening; brewing means disposed to receive hot water from said conduit discharge opening for brewing a beverage; and control means for selectively operating said cold water delivering means, discharge opening-closing means, inlet opening-closing means, and water heating means, whereby (a) cold water is delivered through said conduit into the tank with the discharge opening closed to raise the level of water in the tank to a preselected upper level above the level of said inlet opening, then (b) concurrently the inlet opening is closed, delivery of cold water from said delivering means is discontinued, and said water heating means is energized to heat the water in the tank to a preselected high temperature, and (c) subsequent brewing of beverage in said brewing means is permitted when desired subsequent to the reaching of the preselected high temperature of the water in the tank upon actuation of said control means to concurrently open said inlet and outlet openings to permit passage of hot water downwardly through the conduit to the brewing means for brewing a preselected quantity of beverage therein.

5. The brewing apparatus of claim 4 including means for interlocking the discharge opening closing means and the cold water delivering means to preclude at all times delivery of cold water from said delivering means through said discharge opening.

6. Brewing apparatus comprising: a tank having a bottom and a top; a conduit extending through the bottom of the tank and having a discharge opening below the tank and a portion within the tank provided with an inlet opening spaced below said tank top; means for delivering cold water to said conduit; means for heating water in said tank; means for closing said discharge opening; means for closing said inlet opening; brewing means disposed to receive hot water from said conduit discharge opening for brewing a beverage therein and delivering the brewed beverage therefrom; and control means for selectively operating said cold water delivering means, valve means, and water heating means, whereby (a) cold water is delivered through the conduit with the discharge opening closed and with the inlet opening open for delivery into the tank to raise the level of water therein to a preselected upper level above the level of said inlet opening, then (b) concurrently the inlet opening is closed, delivery of cold water from said delivering means is discontinued, and said water heating means is energized to heat the water in the tank to a preselected high temperature, and (c) subsequent brewing of beverage in said brewing means is permitted when desired subsequent to the reaching of the preselected high temperature of the water in the tank upon actuation of said control means to concurrently open said inlet and outlet openings to permit passage of hot water downwardly through the conduit to the brewing means.

7. The brewing apparatus of claim 6 wherein said valve means includes a valve controlling said discharge opening and said cold water delivering means.

8. The brewing apparatus of claim 6 wherein said valve means includes a valve responsive to the level of water in the tank to control delivery of water into said tank from said cold water delivering means.

9. In a brewing apparatus having a tank provided with a duct for selectively introducing into and removing fluid from the tank, means for controlling the fluid flow comprising: a valve selectively positionable to close the duct; a float connected to the valve for positioning the valve to close the duct when the fluid level in the tank reaches a preselected high level; and means selectively operable to lower the float against the buoyant force through the fluid to position the valve to open the duct.

10. The fluid flow control means of claim 9 wherein said float lowering means comprises a solenoid carried by the tank.

11. In a brewing apparatus having a tank provided with a duct for selectively introducing into and removing fluid from the tank, means for controlling the fluid flow comprising: a valve selectively positionable to close the duct; a float connected to the valve for positioning the valve to close the duct when the fluid level in the tank reaches a preselected high level; and means selectively operable to lower the float against the buoyant force through the fluid to position the valve to open the duct, and release the float when a preselected quantity of the fluid is discharged from the tank thereby to retain the valve in the duct-open position until the fluid level is again restored to said preselected high level.

12. In a brewing apparatus having a tank provided with a duct for selectively introducing fluid into and removing fluid from the tank, means for controlling the fluid flow comprising: means for selectively delivering fluid under pressure to the duct; a valve selectively positionable to close the duct; a float connected to the valve for positioning the valve to close the duct against the pressure of the fluid delivered by said delivering means when the fluid level in the tank reaches a preselected high level; and means selectively operable to preclude delivery of fluid to the duct by said fluid delivering means and lower the float against the buoyant force through the fluid in the tank to position the valve to open the duct and permit discharge of the fluid from the tank through the duct.

References Cited by the Examiner
UNITED STATES PATENTS

| 2,493,932 | 1/50 | Swanson | 99—282 |
| 2,786,408 | 3/57 | Herrera | 99—283 |
| 2,887,038 | 5/59 | Rosander | 99—283 X |
| 3,034,417 | 5/62 | Bunn | 99—283 |

ROBERT E. PULFREY, *Primary Examiner.*

L. W. VARNER, *Examiner.*